(12) United States Patent
Govindan

(10) Patent No.: US 11,586,503 B2
(45) Date of Patent: Feb. 21, 2023

(54) FASTER REBUILDING OF 2-DISK FAILURE IN RAID BY EFFICIENT, MODULAR, DIAGONAL, CONCURRENT PARITY

(71) Applicant: Dell Products L.P., Round Rock, TX (US)

(72) Inventor: Balasundaram Govindan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 678 days.

(21) Appl. No.: 16/459,929

(22) Filed: Jul. 2, 2019

(65) Prior Publication Data

US 2021/0004291 A1 Jan. 7, 2021

(51) Int. Cl.
*G06F 11/10* (2006.01)
*G06F 3/06* (2006.01)

(52) U.S. Cl.
CPC ........ *G06F 11/1092* (2013.01); *G06F 3/0604* (2013.01); *G06F 3/0659* (2013.01); *G06F 3/0689* (2013.01); *G06F 11/1076* (2013.01)

(58) Field of Classification Search
CPC ............. G06F 11/1092; G06F 11/1076; G06F 3/0604; G06F 3/0659; G06F 3/0689
See application file for complete search history.

(56) References Cited

U.S. PATENT DOCUMENTS

| | | | | |
|---|---|---|---|---|
| 6,484,235 B1* | 11/2002 | Horst | ...................... | G06F 3/061 |
| | | | | 711/114 |
| 8,261,016 B1* | 9/2012 | Goel | .................. | G06F 11/1088 |
| | | | | 711/114 |
| 9,026,729 B1* | 5/2015 | Hallak | .................. | G06F 3/0647 |
| | | | | 711/114 |
| 9,490,849 B1* | 11/2016 | Varnica | ............... | G06F 11/1076 |
| 10,079,612 B1* | 9/2018 | Li | ........................ | G06F 11/1076 |
| 11,210,009 B1* | 12/2021 | Freilich | ............... | G06F 11/2071 |
| 2007/0214314 A1* | 9/2007 | Reuter | ................... | G06F 3/0619 |
| | | | | 714/E11.12 |
| 2009/0276680 A1* | 11/2009 | Chiu | ................. | H03M 13/3707 |
| | | | | 714/752 |

(Continued)

OTHER PUBLICATIONS

Corbett et al., Row-Diagonal Parity for Double Disk Failure Correction, Proceedings of the Third USENIX Conference on File and Storage Technologies, San Francisco CA, Mar. 31-Apr. 2, 2004, the USENIX Association.

*Primary Examiner* — Matthew M Kim
*Assistant Examiner* — Matthew N Putaraksa
(74) *Attorney, Agent, or Firm* — Jackson Walker L.L.P.

(57) ABSTRACT

In response to receiving data to be stored in a storage system that includes a plurality of N drives, a method may include storing a first quantity of the data in a first N portions across a first half of the N drives; storing a second quantity of the data in a second N portions across a second half of the N drives; determining first parities to be stored on a first parity drive; determining second parities and storing them on a second parity drive; and calculating third parities based on both the first quantity of the data and the second quantity of the data, wherein the third parities are calculated in a diagonal fashion based on distinct elements of the first N portions and distinct elements of the second N portions, and storing the third parities on a third parity drive.

17 Claims, 7 Drawing Sheets

(56) References Cited

U.S. PATENT DOCUMENTS

| | | | | |
|---|---|---|---|---|
| 2010/0281213 A1* | 11/2010 | Smith | ............... | G06F 3/0689 711/114 |
| 2011/0264949 A1* | 10/2011 | Ikeuchi | ............... | G06F 11/1076 714/6.22 |
| 2015/0067438 A1* | 3/2015 | Suzuki | ............... | G06F 11/1072 714/758 |
| 2017/0123921 A1* | 5/2017 | Ptak | ............... | G06F 3/0689 |
| 2017/0308435 A1* | 10/2017 | Fore | ............... | G06F 11/1088 |
| 2019/0310915 A1* | 10/2019 | Camp | ............... | G06F 3/061 |
| 2020/0133774 A1* | 4/2020 | Kang | ............... | G06F 3/0619 |
| 2020/0174885 A1* | 6/2020 | Hetzler | ............... | G06F 3/0611 |

* cited by examiner

| P1 | 0 | 1 | 0 | 0 | 0 | 0 | 1 | 0 |
|----|---|---|---|---|---|---|---|---|

| | | | | | | | |
|---|---|---|---|---|---|---|---|
| 1 | 0 | 1 | 1 | 0 | 1 | 1 | 0 |
| 0 | 1 | 0 | 1 | 0 | 0 | 0 | 0 |
| 0 | 0 | 0 | 1 | 0 | 1 | 0 | 0 |
| 1 | 0 | 1 | 1 | 0 | 0 | 0 | 0 |
| 1 | 1 | 1 | 1 | 0 | 1 | 1 | 1 |
| 0 | 1 | 1 | 1 | 0 | 0 | 1 | 1 |
| 1 | 0 | 1 | 0 | 1 | 1 | 1 | 0 |
| 0 | 1 | 0 | 0 | 1 | 0 | 1 | 1 |

| P2 | 0 | 1 | 1 | 0 | 0 | 0 | 0 | 1 |
|----|---|---|---|---|---|---|---|---|

FIG. 2

FASTER REBUILDING OF 2-DISK FAILURE IN RAID BY EFFICIENT, MODULAR, DIAGONAL, CONCURRENT PARITY

TECHNICAL FIELD

The present disclosure relates generally to data storage systems and methods, and more particularly to systems and methods for storing parity information usable to re-generate data in the event of hardware failure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

RAID, an acronym for Redundant Array of Independent Disks, includes data storage schemes that can divide and replicate data among multiple physical disk drives. The physical disks are said to be in a RAID array, which is addressed by the operating system as one single disk (also referred to as a virtual disk). Many different schemes or architectures of RAID devices are known to those having ordinary skill in the art, some of which rely on parity information to provide redundancy and fault tolerance. Each different architecture or scheme may provide a different balance among various goals to be achieved in storing data, which include, but are not limited to, increased data reliability and increased input/output (hereinafter "I/O") performance.

In this regard, RAID is a technology that provides increased storage functions and increased reliability through redundancy, and as such may be beneficially employed in information handling systems. Redundancy in a RAID device may be achieved by combining multiple disk drive components, which may include one or more disks of different type, size, or classification, into a logical unit, where data is distributed across the drives in one of several ways called "RAID levels." The data distribution determines the RAID type, e.g., RAID 0, RAID 1, RAID 4, RAID 5, RAID 6, RAID 10, RAID 60, etc.

In its simplest form, parity-based RAID works by striping data across three or more physical storage resources. For example, a data strip may be written to W−1 of the physical storage resources of the RAID array and a parity strip written to one of the physical storage resources of the RAID array, where "W" equals the number of devices in the RAID array.

RAID 4, for example, uses block-level striping with a dedicated parity disk. RAID 5 is similar, but with distributed parity instead of a dedicated parity disk. In both, each parity strip may be written as the logical exclusive OR (XOR) of the data strips within the same stripe as the parity strip. Accordingly, if a physical storage resource of a RAID array fails, the data and/or parity stored on the failed storage resource can be rebuilt by performing an XOR operation on the remaining storage resources. Throughout this disclosure, the XOR operation is discussed for the sake of concreteness. In other embodiments, however, a different parity operation may be chosen, as will be understood by one of ordinary skill in the art with the benefit of this disclosure.

As another example, RAID 6 uses block-level striping with two parity blocks distributed across all member disks. A RAID 6 volume consists of 4 or more hard drives. Two types of parity data are calculated for data written to the drives, referred to respectively as P and Q parity. RAID 6 may typically be costly in terms of processing time, mainly because Q parity generation requires Galois field arithmetic to be performed.

In some embodiments, RAID levels may be nested. For example, RAID 50 (also called RAID 5+0) combines the block-level striping of RAID 0 with the distributed parity of RAID 5 into a RAID 0 array striped across RAID 5 elements. RAID 40 is analogous, but with dedicated rather than distributed parity. RAID 10 is analogous, but with mirroring instead of parity. For example, in a RAID 40 implementation, individual disks may first be combined into parity-based RAID 4 sets referred to as spans. These spans may then be combined into a striped RAID 0 set.

Existing solutions have various problems in terms of reliability and the amount of time required to rebuild an array after a drive failure. Embodiments of this disclosure may improve on existing systems in these and other areas.

SUMMARY

In accordance with the teachings of the present disclosure, the disadvantages and problems associated with existing approaches to data storage may be substantially reduced or eliminated.

In accordance with embodiments of the present disclosure, a method may include, in response to receiving data to be stored in a storage system that includes a plurality of N drives, performing data storing operations comprising: storing a first quantity of the data in a first N portions across a first half of the N drives; storing a second quantity of the data in a second N portions across a second half of the N drives; for each of the first N portions of the first quantity of the data, determining a first parity, and storing each first parity on a first parity drive; for each of the second N portions of the second quantity of the data, determining a second parity, and storing each second parity on a second parity drive; and calculating third parities based on both the first quantity of the data and the second quantity of the data, wherein the third parities are calculated in a diagonal fashion based on distinct elements of the first N portions and distinct elements of the second N portions, and storing the third parities on a third parity drive.

In these and other embodiments, an article of manufacture may include a non-transitory, computer-readable medium having instructions stored thereon that are configured to be executed by an information handling system for, in response to receiving data to be stored in a storage system that includes a plurality of N drives, performing data storing operations comprising: storing a first quantity of the data in a first N portions across a first half of the N drives; storing a second quantity of the data in a second N portions across a second half of the N drives; for each of the first N portions of the first quantity of the data, determining a first parity, and storing each first parity on a first parity drive; for each of the second N portions of the second quantity of the data, determining a second parity, and storing each second parity on a second parity drive; and calculating third parities based on both the first quantity of the data and the second quantity of the data, wherein the third parities are calculated in a diagonal fashion based on distinct elements of the first N portions and distinct elements of the second N portions, and storing the third parities on a third parity drive.

In these and other embodiments, a system may include at least one processor; and a storage system that includes a plurality of N drives; wherein, in response to receiving data to be stored in the storage system, the system is configured to perform data storing operations comprising: storing a first quantity of the data in a first N portions across a first half of the N drives; storing a second quantity of the data in a second N portions across a second half of the N drives; for each of the first N portions of the first quantity of the data, determining a first parity, and storing each first parity on a first parity drive; for each of the second N portions of the second quantity of the data, determining a second parity, and storing each second parity on a second parity drive; and calculating third parities based on both the first quantity of the data and the second quantity of the data, wherein the third parities are calculated in a diagonal fashion based on distinct elements of the first N portions and distinct elements of the second N portions, and storing the third parities on a third parity drive.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a block diagram of an example storage solution with two parity disks, in accordance with the embodiments of the present disclosure;

DETAILED DESCRIPTION

Figure 1:
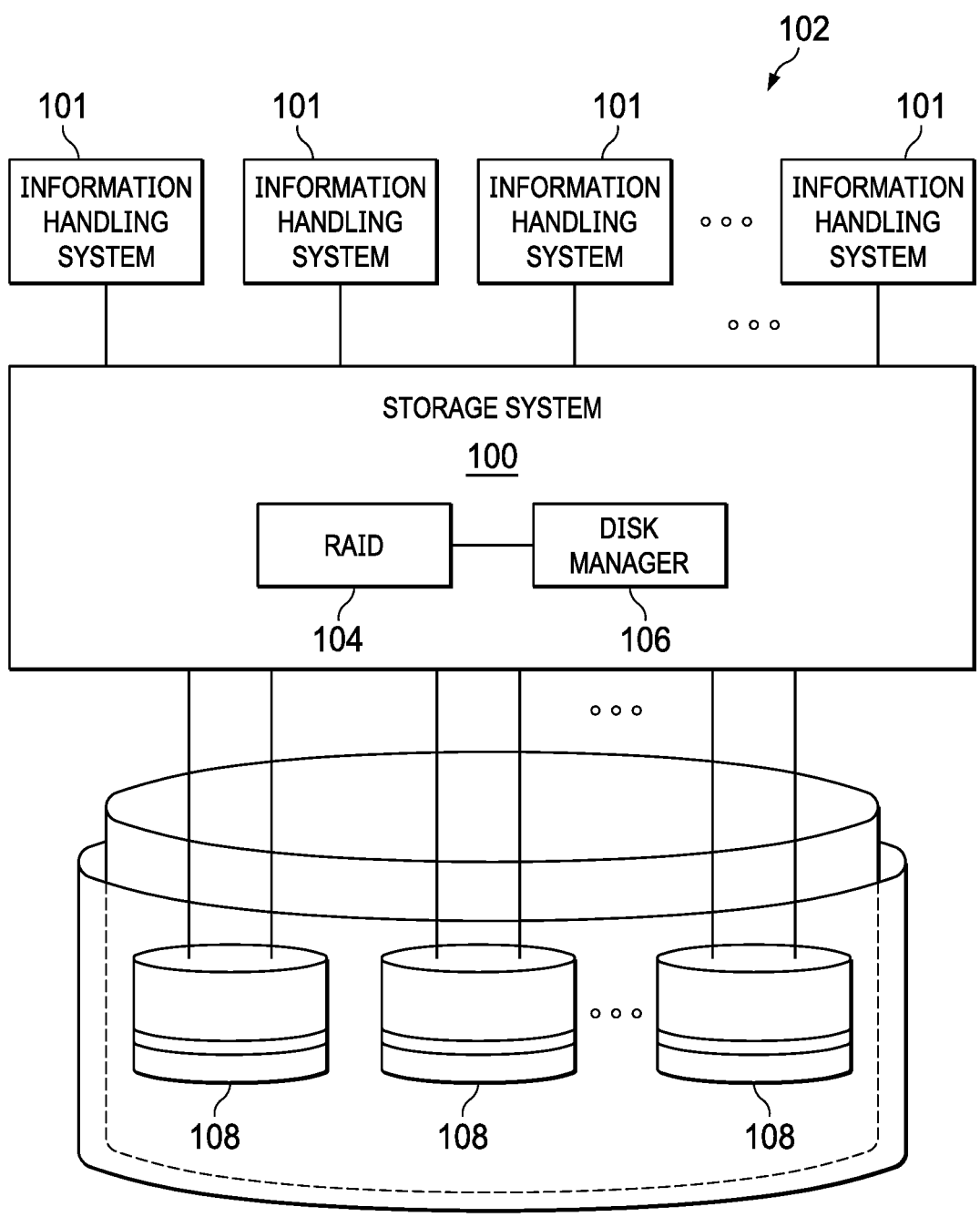
FIG. 1 illustrates a block diagram of an example storage system in an information handling system, in accordance with the embodiments of the present disclosure.

Preferred embodiments and their advantages are best understood by reference to FIGS. 1 through 5C, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time.

Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the terms "drive," "disk," "hard drive," "disk drive," and "physical storage resource" may be used interchangeably and may include any non-volatile storage devices, regardless of whether or not such devices include a physical disk. For example, these terms may include hard drives that operate via magnetic recording, solid-state drives, flash drives, optical drives, magneto-optical drives, compact disk drives, compact disk arrays, etc.

Turning now to FIG. 1, a block diagram is shown of an example storage system 100 in an information handling system environment 102, in accordance with embodiments of the present disclosure. As shown in FIG. 1, environment 102 may include one or more information handling systems 101 communicatively coupled to storage system 100. In some embodiments, an information handling system 101 may comprise a personal computer. In some embodiments, an information handling system 101 may comprise or be an integral part of a server. In other embodiments, an information handling system 101 may comprise a portable information handling system (e.g., a laptop, notebook, tablet, handheld, smart phone, personal digital assistant, etc.).

As shown in FIG. 1, storage system 100 may include RAID subsystem 104 and disk manager 106 having at least one disk storage system controller. Disk manager 106, as shown in FIG. 1, may generally manage disks and disk arrays, including grouping/resource pooling, abstraction of disk attributes, formatting, addition/subtraction of disks, tracking of disk service times and error rates, etc.

Disk manager 106 may also interface with devices, such as a Small Computer System Interface (SCSI) device subsystem which may be responsible for detecting the presence of external storage devices. Such a SCSI device subsystem may be capable, at least for Fibre Channel/SCSI/Serial-Attached SCSI (SAS) type devices, of determining a subset of devices which are block-type target storage devices. It is these devices which may be managed and abstracted by disk manager 106.

Furthermore, disk manager 106 may manage one or more disk storage system controllers. In some embodiments, a plurality of redundant disk storage system controllers may be implemented to cover the failure of an operating disk storage system controller. Redundant disk storage system controllers may also be managed by disk manager 106.

Disk manager 106 may interact with several other subsystems. For example, RAID subsystem 104 may be the major client of the services provided by disk manager 106 for data path activities. RAID subsystem 104 may use disk manager 106 as an exclusive path to disks 108 for I/O. RAID subsystem 104 may also listen for events from disk manager 106 to determine the presence and operational status of disks 108. RAID subsystem 104 may also interact with disk manager 106 to allocate extents for the construction of RAID devices. In some embodiments of the present disclosure, RAID subsystem 104 may include a combination of at least one RAID type, such as RAID 0, RAID 1, RAID 4, RAID 5, RAID 6, RAID 10, RAID 40, RAID 50, and RAID 60. It will be appreciated that other RAID types can be used in alternative RAID subsystems, such as RAID 3, etc.

Disk manager 106 may also utilize services of the SCSI device layer to learn of the existence and operational status of block devices, and may have an I/O path to these block devices. Disk manager 106 may query the SCSI device subsystem about devices as a supporting method to uniquely identify disks. Information handling systems 101, RAID subsystem 104, and disk manager 106 may include various processors, memories, and other information handling resources as appropriate (not shown separately).

For example, a processor included in one of such elements may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or to process data. In some embodiments, a processor may interpret and/or execute program instructions and/or process data stored in RAID subsystem 104, another component of storage system 100, and/or another component of environment 102. A memory may be communicatively coupled to such a processor and may include any system, device, or apparatus configured to retain program instructions and/or data for a period of time (e.g., computer-readable media). Such memory may include RAM, EEPROM, a PCMCIA card, flash memory, magnetic storage, opto-magnetic storage, or any suitable selection and/or array of volatile or non-volatile memory that may retain data after power is turned off.

As discussed above, a RAID 6 array typically includes two extra disks for the storage of parity information. Embodiments of this disclosure may include a third extra parity disk as well.

Many of the embodiments discussed herein will include an even number of data disks (i.e., disks other than parity disks). One of ordinary skill in the art with the benefit of this disclosure will understand how such embodiments may be applied to systems including an odd number of data disks, however.

For example, a system may include N data disks for some even number N. In some embodiments, a first parity disk may include parity data for the first N/2 data disks, and a second parity disk may include parity data for the second N/2 data disks. (For example, the first and second parity disks may implement a RAID 40 type of parity for their respective halves of the N data disks.) The third parity disk may include a "diagonal" parity including information from both halves of the N disks, as discussed below. In various embodiments, parity information may be stored on dedicated parity drives or striped across the drives of an array.

In some embodiments, the rebuilding time of a failed disk may be significantly reduced. Read and write speeds may generally be comparable to the speeds of RAID 6, and no additional read and write penalty may be incurred for the parity calculation. That is, in some embodiments, this disclosure may include the calculation of two parities for each write, similar to the computational cost of RAID 6.

Further, rebuilding after a single-disk failure may be significantly faster than (e.g., twice as fast as) RAID 5 or RAID 6. For two-disk failures, depending on which disks have failed, over half of such failures may have a rebuilding time of half compared to RAID 6. Moreover, RAID 6 calculates its two different parities by different algorithms, while embodiments of this disclosure may only require a single parity algorithm for all three parities (e.g., XOR).

Turning now to FIG. 2, an embodiment for calculating the first and second parities is shown with N=8. That is, an array of 8 data disks 202 through 216 (shown as vertical columns) is logically considered as including two halves 220 and 230. (Only 8 rows of data are shown in FIG. 2 for the sake of clarity and exposition, and thus an 8×8 matrix of data is depicted. One of ordinary skill in the art with the benefit of this disclosure will understand that additional rows are implied, and the calculations shown and described herein may be extended as needed.)

As shown in FIG. 2, a first parity disk 240 may be populated with parity data (e.g., based on an XOR operation) from the first half 220 comprising the first four data disks. A second parity disk 242 may be populated with parity data (e.g., based on an XOR operation) from the second half 230 comprising the second four disks. These first two sets of parity data may generally be referred to as "row level" parity, because their elements are generated from each row of data in the arrangement shown.

As will be understood by one of ordinary skill in the art with the benefit of this disclosure, a single-disk failure of a data disk in either of the two halves may be remedied by re-generating its data based on the parity disk for that half, and writing that data to a spare disk such as a hot spare disk. (Likewise, if a parity disk were to fail, its data could be re-generated from the data disks in that half.) Thus no additional I/O traffic may be required for the disks in the unaffected half while the single-disk failure is being remedied.

For example, if data disk 204 were to fail, its contents could be re-generated by XORing the contents of each respective row of data from first parity disk 240, data disk 202, data disk 206, and data disk 208.

Further, if a two-disk failure involves one disk from each half (rather than two disks from the same half), the same solution may employed. That is, each of the failed disks may be rebuilt based on the parity data for its respective half. Such a two-disk recovery may even be carried out concurrently for the sake of efficiency.

For example, if data disk 214 were to fail concurrently with data disk 204, its contents could be re-generated by XORing the contents of each respective row of data from second parity disk 242, data disk 210, data disk 212, and data disk 216.

The foregoing discussion may not apply, however, for a two-disk failure where both failed disks were in the same half. But it does provide a fast solution for the cases where the failed disks are in different halves (e.g., more than 55% of the time in this embodiment).

Figure 3:
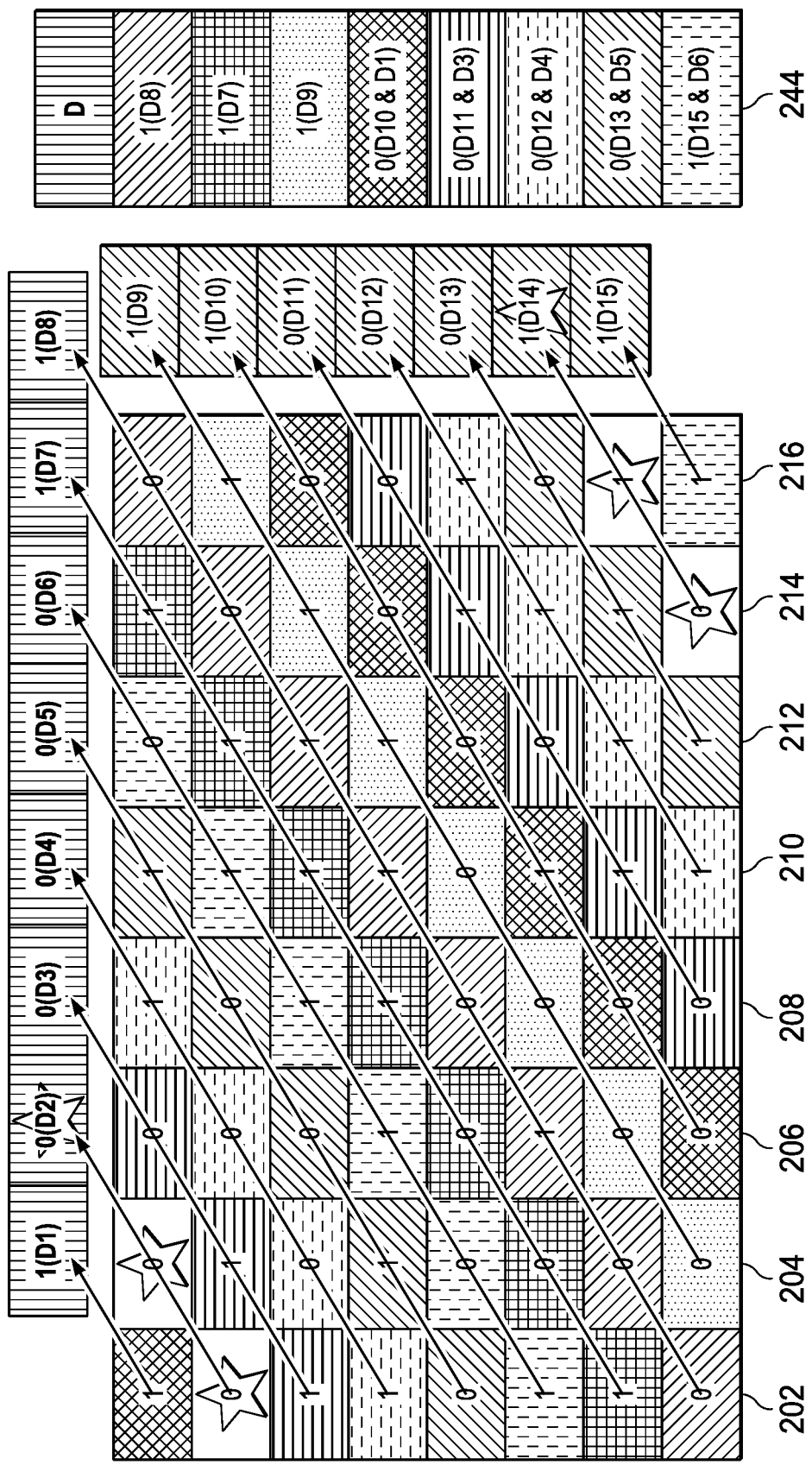
FIG. 3 illustrates a block diagram of calculation of a third diagonal parity, in accordance with embodiments of the present disclosure.

Turning now to FIG. 3, an embodiment is shown for generating diagonal parity to be stored on a third parity disk, which is applicable to additional failure modes. For example, this embodiment may be used to recover from a two-disk failure falling within a single half of an array. Further, this embodiment may be used to recover from certain types of three-disk failures. For clarity, the first and second parity disks are not shown in FIG. 3.

In general, for N disks, there would be 2N−1 diagonals which could potentially give rise to parity data. However, it may not be necessary to store all 2N−1 elements of parity data in order to ensure reliability. In some embodiments, the amount of storage may be reduced to N elements by combining some of the diagonals (e.g., XORing the parity of one diagonal with that of another diagonal).

More concretely, in this 8×8 grid of data, 15 different diagonals are present and marked as D1 through D15. Parity may be calculated as shown at diagonal parity disk 244 to reduce the amount of storage required from 15 bits to 8 bits. That is, the 8 parity bits to be stored are generated respectively from the parities (e.g., XOR parities) of D8; D7; D9; D10 and D1; D11 and D3; D12 and D4; D13 and D5; and D15 and D6.

In general, for an N×N data grid, this data reduction may be accomplished by combining diagonals as follows. The 2N−1 diagonals may be labeled as D1, D2, ... D(N−1), DN, D(N+1), ... D(2N−2), D(2N−1). The parity bits may then be calculated as:

DN
D(N−1)
D(N+1)
D(N+2) combined with D1
D(N+3) combined with D3
...
D(2N−3) combined with D(N−3)
D(2N−1) combined with D(N−1).

As one of ordinary skill in the art with the benefit of this disclosure will understand, in other embodiments, the diagonals may be combined in different ways. Further, in some embodiments, certain diagonals may give rise to parity data that may not need to be stored at all. In the embodiment of FIGS. 3, D2 and D14 are marked with stars because they are not needed: any failed disks may be recovered (as discussed in more detail below) even if the parity data from those diagonals is not stored on the diagonal parity disk.

Figure 4:
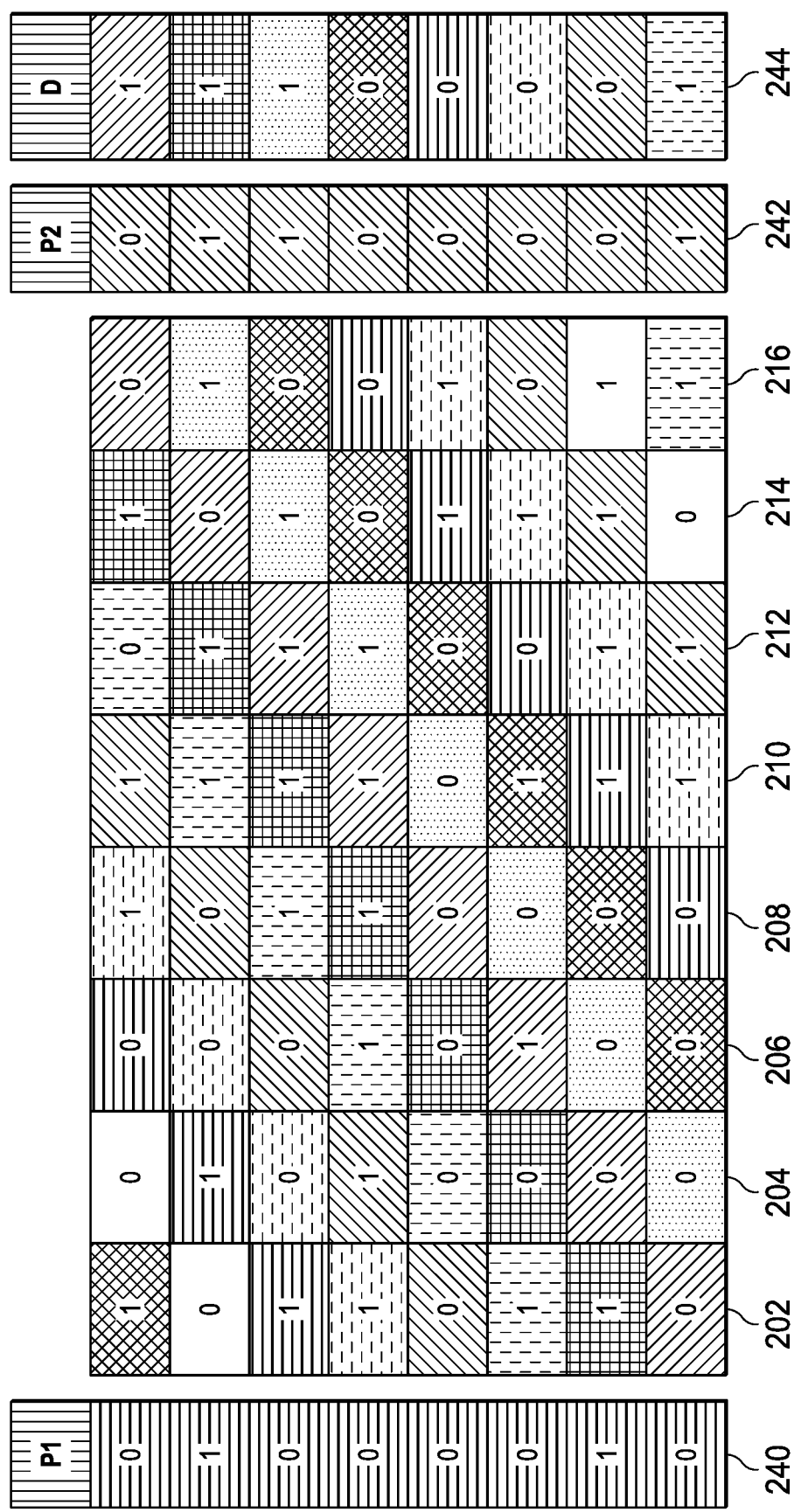
FIG. 4 illustrates a block diagram of an example storage solution with three parity disks, in accordance with the embodiments of the present disclosure.

FIG. 4 shows the result of the above calculations, including first parity disk 240, second parity disk 242, and diagonal parity disk 244. Using these parities, any two-disk failure can be efficiently rebuilt. Further, some three-disk failures can also be rebuilt (e.g., failures where the three failed disks are not all in the same half of the array, which is approximately 80% of three-disk failures in this embodiment).

For example, in the case of a two-disk failure where both disks are in different halves of the grid, the failed disks can be rebuilt concurrently as discussed above (e.g., without even relying on diagonal parity disk 244. In the case of a two-disk failure where both disks are in the same half of the grid, the failed disks can be rebuilt using all three parities.

Figure 5A:
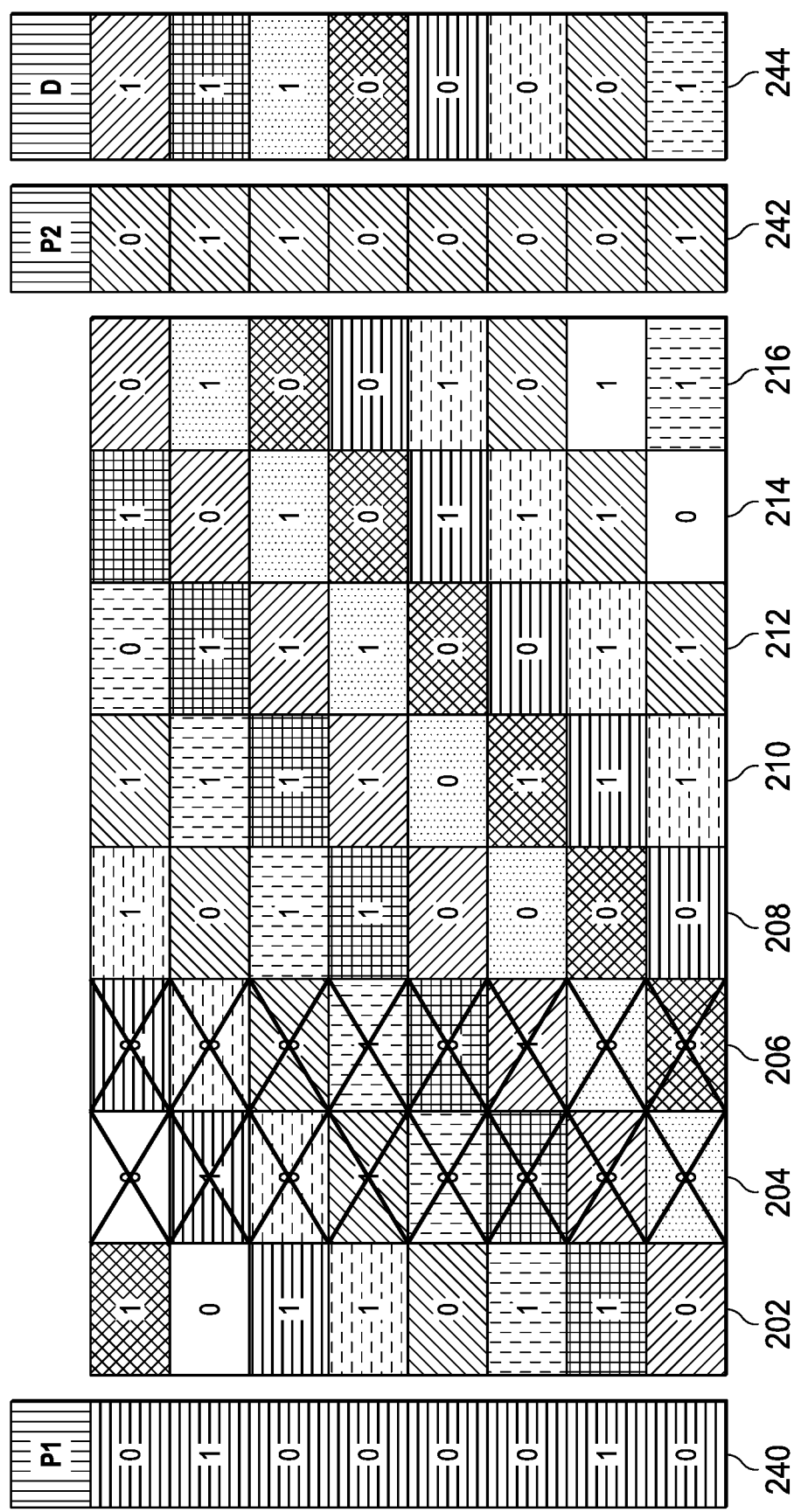
FIGS. 5A through 5C illustrate block diagrams of example data recovery solutions, in accordance with embodiments of this disclosure.
Figure 5B:
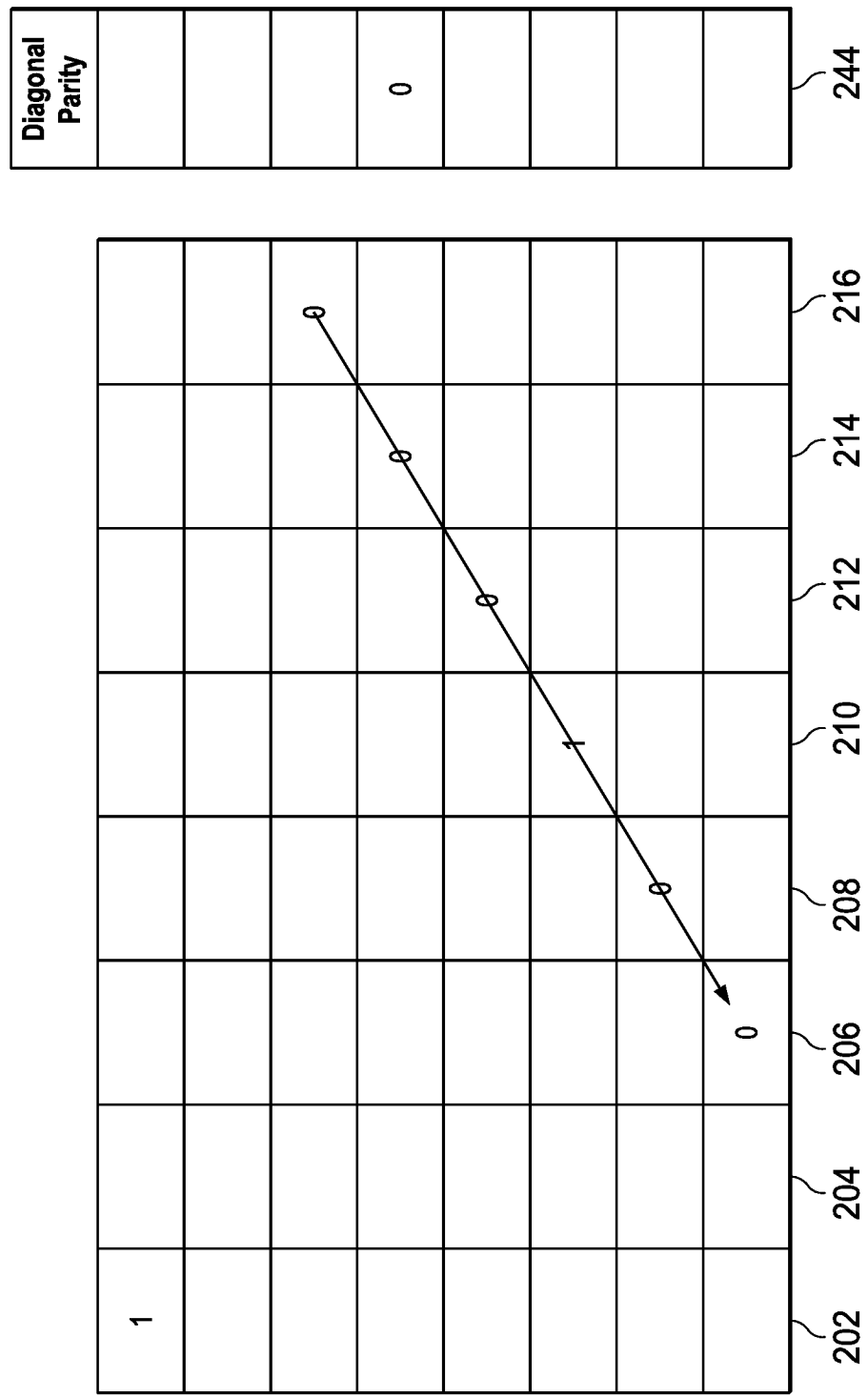
Figure 5C:
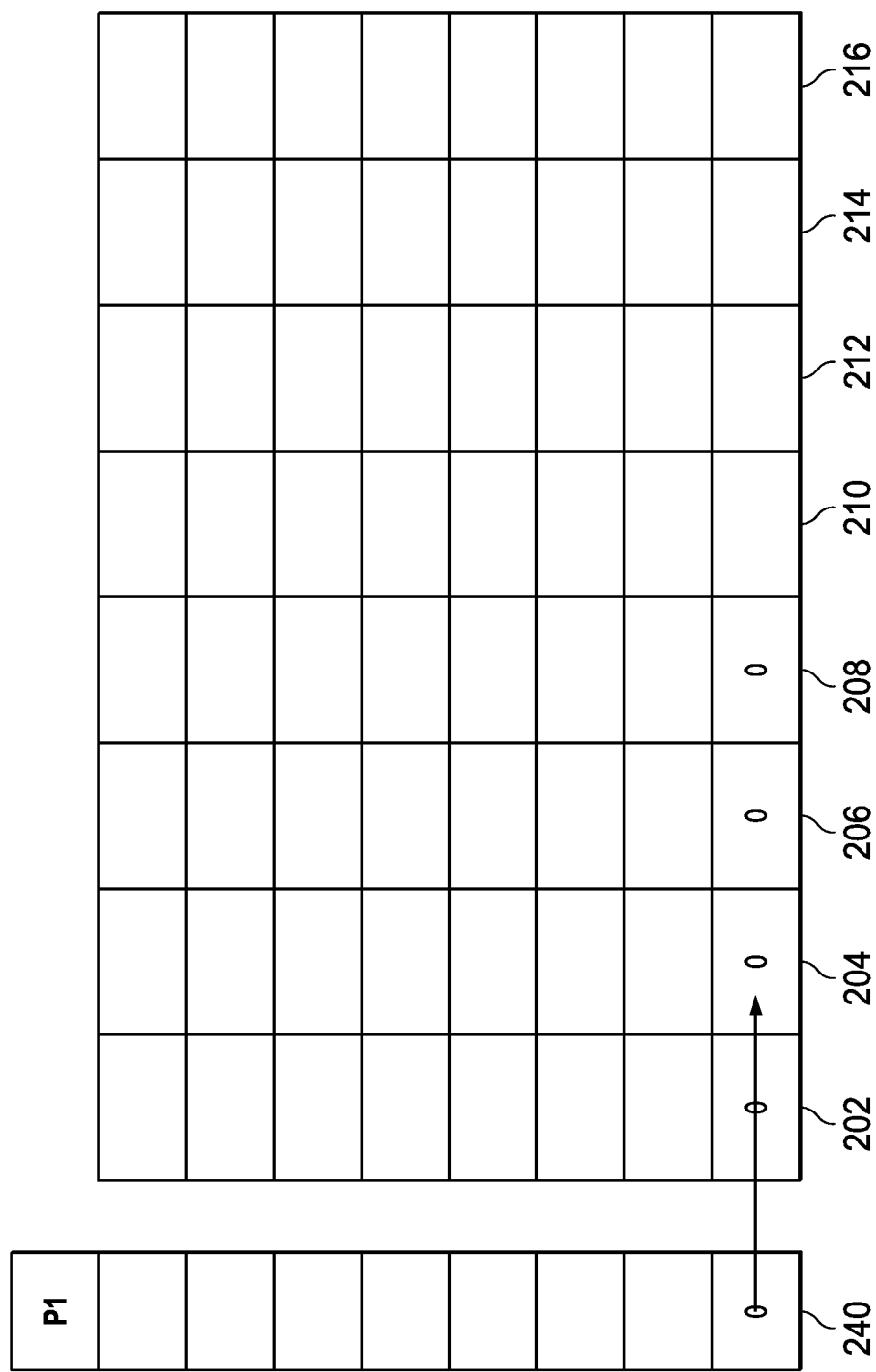

FIGS. 5A-5C show an embodiment of a recovery of a two-disk failure where both disks are in the same half of the grid. Further details and an example are discussed below, but at a high level, the procedure may be described as follows:

1. Identify an element of diagonal parity in which only one piece of data is missing.
2. Recover that missing piece of data using the diagonal parity value and the other values from that diagonal.
3. After recovery of that missing element, recover the other missing element in the same row using the available row parity.
4. Iterate steps 1-3 to rebuild all of the data of the two failed disks.

As shown in FIG. 5A, both of data disks 204 and 206 have failed. At FIG. 5B, an element of data disk 206 is identified for which the remainder of the corresponding diagonal parity information is still available. That is, the indicated element of data disk 206 is the only missing data of its diagonal. With momentary reference back to FIG. 3, the diagonal parity element that was generated by diagonals D10 and D1 may be used to recover the indicated element of data disk 206 as shown (e.g., by computing an XOR operation of the remaining elements of the indicated diagonals and the corresponding element of diagonal parity disk 244).

Once this is completed, as shown at FIG. 5C, the other missing element of that row (which is from data disk 204) may be recovered with the use of row parity information stored on first parity disk 240.

This procedure may then be repeated for the remaining elements of missing data. For example, once the indicated element of data disk 204 is recovered at FIG. 5C, an element of data disk 206 one row higher becomes recoverable via a procedure similar to that shown at FIG. 5B, but using the D9 diagonal parity instead of the D10 and D1 diagonal parity.

In this way, the recovery procedure may proceed by building upon its own prior results. For the sake of brevity, the remainder of this recovery need not be shown in detail.

As one of ordinary skill in the art with the benefit of this disclosure will understand, the recovery procedure may alternate back and forth between recovering a bit using diagonal parity and recovering a bit using row parity until all of the missing data has been re-generated and stored on hot spare disks.

As noted above, certain types of three-disk failures may also be recovered (e.g., the failures in which not all three of the failed disks are in the same half of the array). For example, if one of the data disks in the second half of the array (e.g., data disk 214) were to fail concurrently with the described failure of data disks 204 and 206 in the first half of the array, then that failure could be treated as a single-disk failure with regard to the second half of the array. That is, data disk 214 could be recovered first through the use of row parity stored on second parity disk 242. Subsequently, the procedure described with reference to FIGS. 5A-5C could be used to recover data disks 204 and 206.

The foregoing discussion of I/O handling scenarios is presented at a relatively high level for the sake of brevity, and the low-level details will be apparent to one of ordinary skill in the art with the benefit of this disclosure.

In some embodiments, the diagonal parity described herein may be calculated on top of RAID 40 or RAID 50 to rebuild two-disk failures anywhere in the RAID grid by a faster and more efficient algorithm than prior approaches. Further, embodiments of this disclosure may be layered with other RAID levels.

Various embodiments of this disclosure may provide advantages over existing approaches, some of which are mentioned in the numbered list below. In any particular embodiment, however, one of ordinary skill in the art will recognize that not all of such advantages may be applicable.

1. Efficiency in rebuilding of one-disk or two-disk failures. Fast rebuilding of such failures 100% of the time.
2. Possibility (e.g., 80% of the time) to rebuild after a three-disk failure.
3. Parity calculation is simple and computationally undemanding, in that one type of parity calculation may be sufficient for all the different parities used. Less complexity is required than in approaches using different parity algorithms.
4. The penalty for reading and writing is the same as in RAID 6. Each data write calculates two parity elements. But rebuilding is more efficient, as only half of the data is read to rebuild the failed disk.
5. This disclosure is scalable and easy to implement for any number of disks. For example, for an odd number of data disks, the discussions above may be straightforwardly extended by one of ordinary skill in the art with the benefit of this disclosure.
6. In the event of a parity disk failure (or even in the event of both of the row parity disks failing and an additional single data disk failing) the data is recoverable.
7. Separate disks for data and parity may be used. Data is protected by two parity elements. Accordingly, the failure of any one parity disk does not affect the level of data protection as such. Keeping data and parity in separate disk may improve the performance of the data disks.
8. Compared to existing methods, one additional parity disk may be used as storage for diagonal parity. But RAID typically uses inexpensive disks, and adding this extra storage is insignificant compared to the benefits.
9. Embodiments provide faster rebuilding of failed disks than existing solutions.
10. Embodiments do not require as many extra disks for parity storage than some existing solutions such as RAID 1.
11. Easy to implement, in that existing RAID controller parity implementations may be leveraged.
12. Compared with RAID 40 and RAID 5, embodiments of this disclosure may recover from two-disk failures anywhere in the disk array.
13. Compared with RAID 60, embodiments of this disclosure may recover from two-disk failures, but with only three parity disks. RAID 60 requires at least four disks for parities. For example, to handle a two-disk failure with RAID 60 with 4 RAID subarrays would require eight additional disks for parity. In this disclosure, such a failure can be handled with only disks on top of RAID 50.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:
   in response to receiving data to be stored in a storage system that includes a plurality of N drives, performing data storing operations comprising:
      segregating the N drives into a first half and a second half;
      storing a first quantity of the data in a first N/2 portions across the first half of the N drives;
      storing a second quantity of the data in a second N/2 portions across the second half of the N drives;
      for each of the first N/2 portions of the first quantity of the data, determining a first parity, and storing each first parity on a first parity drive;
      for each of the second N/2 portions of the second quantity of the data, determining a second parity, and storing each second parity on a second parity drive,
   wherein the first parity drive is operable to store only the first parities, and wherein the second parity drive is operable to store only the second parities; and calculating third parities based on both the first quantity of the data and the second quantity of the data, wherein the third parities are calculated in a diagonal fashion based on distinct elements of the first N/2 portions and distinct elements of the second N/2 portions, and storing the third parities on a third parity drive, wherein the third parity drive is operable to store only the third parities.

2. The method of claim 1, wherein the first, second, and third parities are calculated based on an XOR operation.

3. The method of claim 1, wherein at least one of the first, second, and third parities are based on an XOR operation.

4. The method of claim 1, further comprising: in response to a failure of a particular drive in the first half of the N drives, re-generating data based on the first parities.

5. The method of claim 4, further comprising: in response to a contemporaneous failure of a second particular drive in the second half of the N drives, concurrently re-generating data based on the second parities.

6. The method of claim 5, further comprising: in response to a contemporaneous failure of a third particular drive, re-generating data based on the third parities.

7. An article of manufacture comprising a non-transitory, computer-readable medium having instructions stored thereon that are configured to be executed by an information handling system for, in response to receiving data to be stored in a storage system that includes a plurality of N drives, performing data storing operations comprising:
segregating the N drives into a first half and a second half;
storing a first quantity of the data in a first N/2 portions across the first half of the N drives;
storing a second quantity of the data in a second N/2 portions across the second half of the N drives;
for each of the first N/2 portions of the first quantity of the data, determining a first parity, and storing each first parity on a first parity drive;
for each of the second N/2 portions of the second quantity of the data, determining a second parity, and storing each second parity on a second parity drive, wherein the first parity drive is operable to store only the first parities, and wherein the second parity drive is operable to store only the second parities; and
calculating third parities based on both the first quantity of the data and the second quantity of the data, wherein the third parities are calculated in a diagonal fashion based on distinct elements of the first N/2 portions and distinct elements of the second N/2 portions, and storing the third parities on a third parity drive, wherein the third parity drive is operable to store only the third parities.

8. The article of claim 7, wherein the first, second, and third parities are calculated based on an XOR operation.

9. The article of claim 7, wherein at least one of the first, second, and third parities are based on an XOR operation.

10. The article of claim 7, wherein the instructions are further for: in response to a failure of a particular drive in the first half of the N drives, re-generating data based on the first parities.

11. The article of claim 10, wherein the instructions are further for: in response to a contemporaneous failure of a second particular drive in the second half of the N drives, concurrently re-generating data based on the second parities.

12. The article of claim 11, wherein the instructions are further for: in response to a contemporaneous failure of a third particular drive, re-generating data based on the third parities.

13. A system comprising:
at least one processor; and
a storage system that includes a plurality of N drives;
wherein, in response to receiving data to be stored in the storage system, the system s configured to perform data storing operations comprising:
storing a first quantity of the data n a first N/2 portions across a first half of the N drives;
storing a second quantity of the data n a second N/2 portions across a second half of the N drives;
for each of the first N/2 portions of the first quantity of the data, determining a first parity, and storing each first parity on a first parity drive;
for each of the second N/2 portions of the second quantity of the data, determining a second parity, and storing each second parity on a second parity drive, wherein the first parity drive is operable to store only the first parities, and wherein the second parity drive is operable to store only the second parities; and
calculating third parities based on both the first quantity of the data and the second quantity of the data, wherein the third parities are calculated in a diagonal fashion based on distinct elements of the first N/2 portions and distinct elements of the second N/2 portions, and storing the third parities on a third parity drive, wherein the third parity drive is operable to store only the third parities.

14. The system of claim 13, wherein the first, second, and third parities are calculated based on an XOR operation.

15. The system of claim 13, wherein the operations further comprise: in response to a failure of a particular drive in the first half of the N drives, re-generating data based on the first parities.

16. The system of claim 15, wherein the operations further comprise: in response to a contemporaneous failure of a second particular drive in the second half of the N drives, concurrently re-generating data based on the second parities.

17. The system of claim 16, wherein the operations further comprise: in response to a contemporaneous failure of a third particular drive, re-generating data based on the third parities.

* * * * *

UNITED STATES PATENT AND TRADEMARK OFFICE
CERTIFICATE OF CORRECTION

| | | |
|---|---|---|
| PATENT NO. | : 11,586,503 B2 | Page 1 of 1 |
| APPLICATION NO. | : 16/459929 | |
| DATED | : February 21, 2023 | |
| INVENTOR(S) | : Balasundaram Govindan | |

It is certified that error appears in the above-identified patent and that said Letters Patent is hereby corrected as shown below:

In the Claims

1. In Column 12, Line 17, Claim 13, delete "system s" and insert -- system is --, therefor.

2. In Column 12, Line 19, Claim 13, delete "data n" and insert -- data in --, therefor.

3. In Column 12, Line 21, Claim 13, delete "data n" and insert -- data in --, therefor.

Signed and Sealed this
Twenty-ninth Day of August, 2023

Katherine Kelly Vidal
*Director of the United States Patent and Trademark Office*